(12) United States Patent
Howe

(10) Patent No.: US 8,971,184 B2
(45) Date of Patent: Mar. 3, 2015

(54) LATENCY BASED RANDOM EARLY DISCARD FOR NETWORK PACKETS

(75) Inventor: Jeffrey Howe, West Chicago, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 311 days.

(21) Appl. No.: 12/794,854

(22) Filed: Jun. 7, 2010

(65) Prior Publication Data
US 2010/0309783 A1 Dec. 9, 2010

Related U.S. Application Data

(60) Provisional application No. 61/184,868, filed on Jun. 8, 2009.

(51) Int. Cl.
| | |
|---|---|
| *G01R 31/08* | (2006.01) |
| *H04L 12/823* | (2013.01) |
| *H04L 12/26* | (2006.01) |
| *H04L 12/801* | (2013.01) |
| *H04L 12/841* | (2013.01) |

(52) U.S. Cl.
CPC .......... *H04L 47/326* (2013.01); *H04L 43/0852* (2013.01); *H04L 43/16* (2013.01); *H04L 47/10* (2013.01); *H04L 47/283* (2013.01)
USPC ......... 370/230.1; 370/231; 370/232; 370/412

(58) Field of Classification Search
CPC ....... H04L 47/10; H04L 47/32; H04L 47/326; H04L 47/30
USPC .............. 370/229, 230, 230.1, 231, 232, 235, 370/252, 412
See application file for complete search history.

(56) References Cited

U.S. PATENT DOCUMENTS

| | | | | |
|---|---|---|---|---|
| 7,336,672 | B1 * | 2/2008 | Aweya et al. | 370/412 |
| 8,107,369 | B2 * | 1/2012 | Sagfors | 370/230 |
| 2005/0052992 | A1 * | 3/2005 | Cloonan et al. | 370/229 |
| 2005/0281279 | A1 * | 12/2005 | Dennison et al. | 370/412 |
| 2006/0067213 | A1 * | 3/2006 | Evans et al. | 370/229 |
| 2008/0259927 | A1 * | 10/2008 | Evans et al. | 370/394 |

* cited by examiner

*Primary Examiner* — Jung Park
(74) *Attorney, Agent, or Firm* — Troy A. Van Aacken

(57) ABSTRACT

Methods, systems, and apparatus used to determine whether to discard a network packet based upon the latency exhibited by an associated a network packet queue. Network devices can include a queue management module operable to identify a latency metric in network packet queues and determine whether the latency metric renders the network packet queue eligible for discarding packets based upon, for example, a latency policy.

21 Claims, 5 Drawing Sheets

LATENCY BASED RANDOM EARLY DISCARD FOR NETWORK PACKETS

RELATED APPLICATIONS

This application claims priority as a non-provisional utility of U.S. Provisional Patent Application Ser. No. 61/184,868, entitled "Latency based Random Early Discard for Network Packets," filed Jun. 8, 2009, which is incorporated herein by reference in its entirety.

TECHNICAL FIELD

This disclosure relates to queue management.

BACKGROUND

The Data-Over-Cable Service Interface Specification (DOCSIS) was established by cable television network operators to facilitate transporting data traffic, primarily Internet traffic, over existing community antenna television (CATV) networks. In addition to transporting data traffic, as well as television content signals over a CATV network, multiple services operators (MSO) also use their CATV network infrastructure for carrying voice, video on demand (VoD) and video conferencing traffic signals, among other types.

The number of services provided through the MSO over a hybrid fiber-cable (HFC) network can lead to overloading of the network. Weighted random early discard (WRED) mechanisms have traditionally been used to identify an overloading situation and to provide a determination of which packets should be dropped in a multiple priority queuing type system. Typically, WRED mechanisms identify overloading conditions based upon memory usage nearing a threshold. Once the threshold has been exceeded, the WRED mechanism makes a discard decision for incoming packets at least in part based upon the memory usage.

SUMMARY

Systems and methods of this disclosure can operate to discard packets responsive a time-based metric associated with a packet queue. Example methods can include the steps of: identifying a plurality of queues for data packets; identifying a time-based metric associated with each of the plurality of queues; determining whether the time-based metric associated with any of the plurality of queues exceeds a threshold value associated with the queue; and determining whether to discard one or more packets from those queues where the time-based metric associated with the queue exceeds the threshold value.

Other example methods can include: receiving an incoming data packet; identifying a queue with which the incoming data packet is associated from among a plurality of queues; placing the data packet into the identified queue; identifying a time-based metric associated with the identified queues; determining whether the time-based metric associated with the identified queue exceeds a threshold value associated with the identified queue; and determining whether to discard one or more packets from the identified queue where the time-based metric associated with the identified queue exceeds the threshold value.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In some implementations of this disclosure, systems and methods can operate to identify priority queues eligible for early discard of packets based upon the latency associated with one or more packets within the queue. For example, if there are three priority queues A, B and C, and the latency associated with queue A exceeds a threshold, queue A can be identified as eligible for early discard of packets. Systems and methods of this disclosure can also operate to identify which of one or more packets are eligible for early discard. For example, incoming packets can be identified as eligible for early discard. Moreover, systems and methods of this disclosure can operate to identify a probability with which an identified packet will be discarded. Thus, for example, incoming packets to a priority queue eligible for early discard can be discarded with some probability (e.g., based upon the latency associated with one or more packets in the eligible queue).

Figure 1:
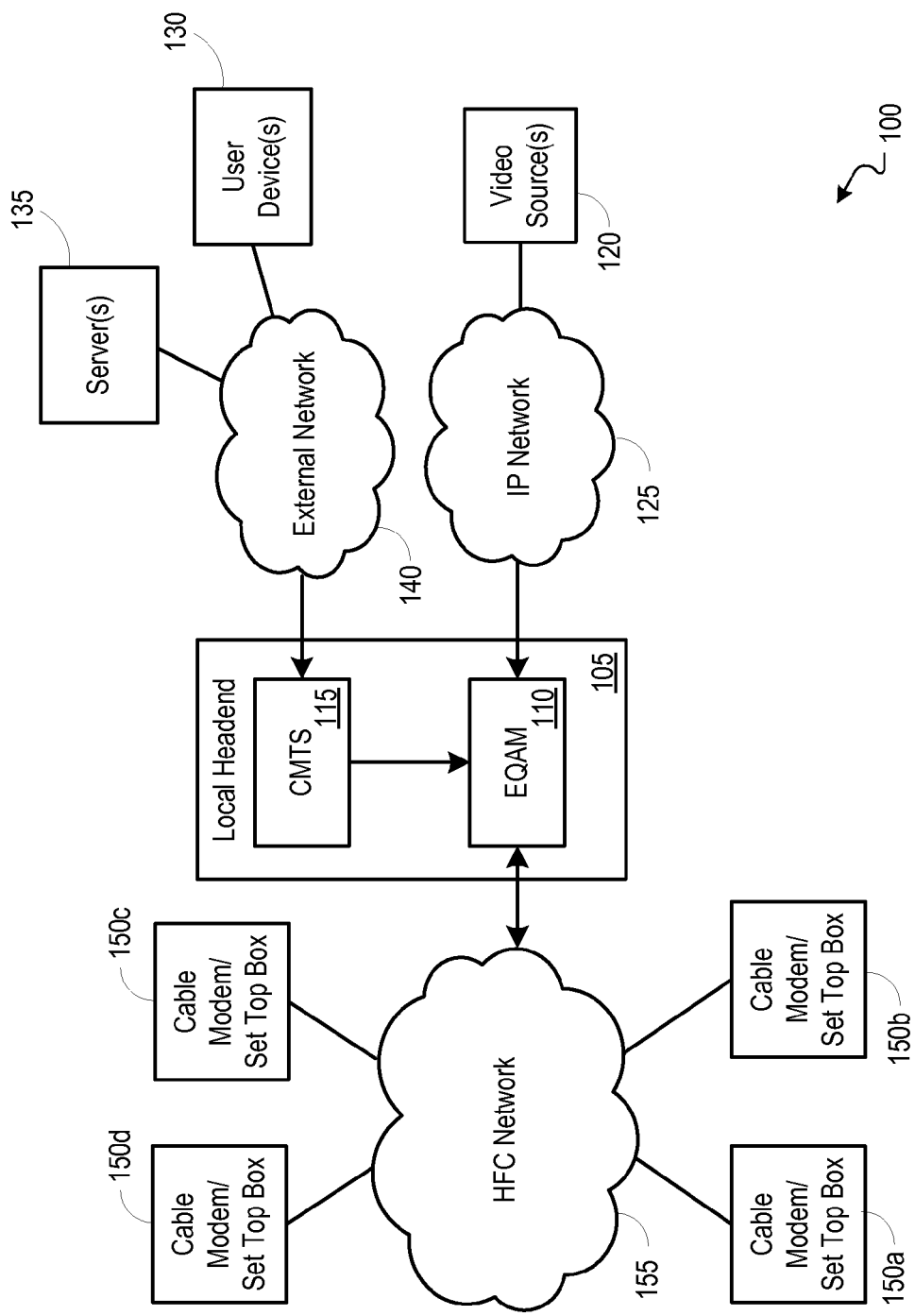
FIG. 1 is a block diagram illustrating an exemplary network environment operable to include latency based random early discard on network devices.

FIG. 1 is a block diagram illustrating an exemplary network environment 100 operable to include latency based random early discard on network devices. In some implementations, a headend 105 can provide video, data and voice service to a subscriber. The headend 105 can include devices such as an edge quadrature amplitude modulation (EQAM) device 110 and a cable modem termination system (CMTS) 115. Video streams can be received from a video source (or sources) 120 through an IP network. In some implementations, these video streams can enter the system as raw moving picture experts group (MPEG) streams, or any other streaming video protocol supported by the headend 105 and/or EQAM device 110.

Data services can be handled by the headend 105 through a CMTS 115. The CMTS 115 can receive data signals from user device(s) 130 and server(s) 135 through an external network 140 (e.g., the Internet). The external network, for example, can operate using Internet protocol (IP), sending data packets to and receiving data packets from the headend 105. In some examples, the CMTS can be paired with a SIP proxy server operable to provide voice over internet protocol (VoIP) services with connectivity to the public switched telephone network (PSTN). In still further examples, one or more video sources may provide streaming data through the external network 140 to the CMTS 115.

The CMTS can forward received packets to the EQAM device 110 used to modulate the signal onto a carrier waveform. The carrier waveform can include both data and video streams, in both multicast and unicast (e.g., point-to-point) formats for transmission to one or more cable modems and/or set top boxes 150a-d via a hybrid fiber-coax (HFC) network 155. It should be understood that in some implementations, the modulation functionality (or portions thereof) can be incorporated into the CMTS. Thus, a CMTS can include a modulator operable to modulate the signal onto a carrier wave and/or slot the carrier wave into a DOCSIS channel to be combined with other DOCSIS channels by a combiner.

In some implementations, data packets can be separated into multiple queues at a network device (e.g., a CMTS 115, EQAM 110, network router, etc.) based upon a type of data associated with the data packets. Different types of data can have different quality of service (QoS) characteristics, respectively. In various instances, the QoS characteristic can be based, for example, upon a standard associated with the type of data contained in the data packet. For example, for application layer queuing, video conferences or voice conversations might be identified as of the highest priority type of data based upon bandwidth constraints and/or nature of the data session (e.g., real-time communications). Alternatively, electronic mail (e.g., e-mail) might be of lower priority because such packets only have a "best efforts" delivery priority. In other examples, queuing can be based upon lower level packet information, such as, e.g., a protocol type associated with the packet.

Thus, each queue on a network device can be prioritized according to the delivery conditions placed on the packet type (e.g., by a standards organization, system administrator, user, etc.). However, under periods of heavy use (e.g., network overload), the delivery of some packets (e.g., in lower priority queues) to their respective recipients might be prevented or delayed. In instances of network overload, it can become impractical to deliver all of the packets. Previous systems have implemented a memory usage based weighted random early discard (WRED) mechanism, whereby packets can be dropped (or dropped with some probability or rate) by the system based upon the amount of space being used in the buffer. For example, if a buffer grew to over a threshold size for a particular queue, the system could start randomly dropping incoming packets destined to that queue and increase the rate of randomly dropping packets if the buffer continued to increase in size. Using the memory based WRED mechanism to determine how to drop packets views the decision making process only from the perspective of conserving system resources rather than focusing on an end-user experience.

Alternatively, the random early discard decision can be based upon queue latency, or other time-based metric, e.g., including a metric derived from an earliest deadline first scheduler. Identifying packets for discard using queue latency can focus the early discard decision on end-user experience. In some implementations, the random early discard decision can be based upon the latency of the oldest packet in a particular queue. In other implementations, the random early discard decision can be based upon the average latency or median latency of packets in a particular queue.

In some implementations, an incoming packet can trigger the network device (e.g., CMTS 115, EQAM 110, router, server, etc.) to analyze an associated queue to determine whether the latency in the queue makes the queue eligible for random early discard of one or more packets. Thus, for example, when an incoming packet is received, the network device can calculate the latency of the queue and compare the latency of the queue to a threshold latency policy (e.g., one or more threshold latency values). In some implementations, the threshold can be set by a manufacturer (e.g., a default threshold) or a system administrator. In other implementations, the threshold latency policy can be based upon other factors.

As mentioned above, the latency of a queue can be measured in a variety of different ways. In some implementations, the queue latency can be calculated as an average or median length of time the packets have been in the queue. In another implementation, the queue latency can be measured by the length of time the oldest packet has been in the queue (e.g., the first packet in a first-in first-out (FIFO) buffer). In still further implementations, queue latency can be measured by using some subset of packets in the queue (e.g., the five oldest packets in the queue).

It should also be understood that queue latency can be measured in terms of a difference between a current time and a time stamp on the one or more packets being used to measure latency (e.g., the total time the packet has spent in the queue). Alternatively, queue latency can be measured based upon a difference in time between a target delivery time and a current time. Other metrics can be used to identify queue latency.

In alternative implementations, a combination of latency based random early discard and memory space based WRED can be used. Such a combination can focus the early discard decision on both the end-user experience and preservation of system resources. In such implementations, if the latency exceeds a threshold latency identified by a latency policy or if the memory usage exceeds a threshold, then new or existing packets can be identified as candidates for early discard.

In some implementations the buffer usage can be tied into the latency drop decision without having to run the entire space-based WRED process in parallel. Such implementations can facilitate execution of a single latency based WRED process that takes into account both the user experience and protects the queuing fabric. In such implementations, when the fabric reaches a certain threshold, the latency threshold can be proportionally reduced. Thus, for example, if an empty queue begins with thresholds of 50 msec to start dropping a few packets, and 150 msec before all packets are dropped, when the fabric becomes 90% full, the process can automatically begin reducing the thresholds. In this example, if the buffer usage continues to rise after packets are randomly dropped, the thresholds may be reduced to 25 and 75 msec at 95% full, and may drop to 0 and 0 when the queue reaches 100%, which effectively results in all traffic being dropped. Thus, as the buffer usage increases past a certain threshold, the process can become more aggressive in dropping the packets. Thus, the most congested ports would typically be most affected since those ports would have the greatest latencies, while lightly loaded ports can continue to pass traffic normally.

Figure 2:
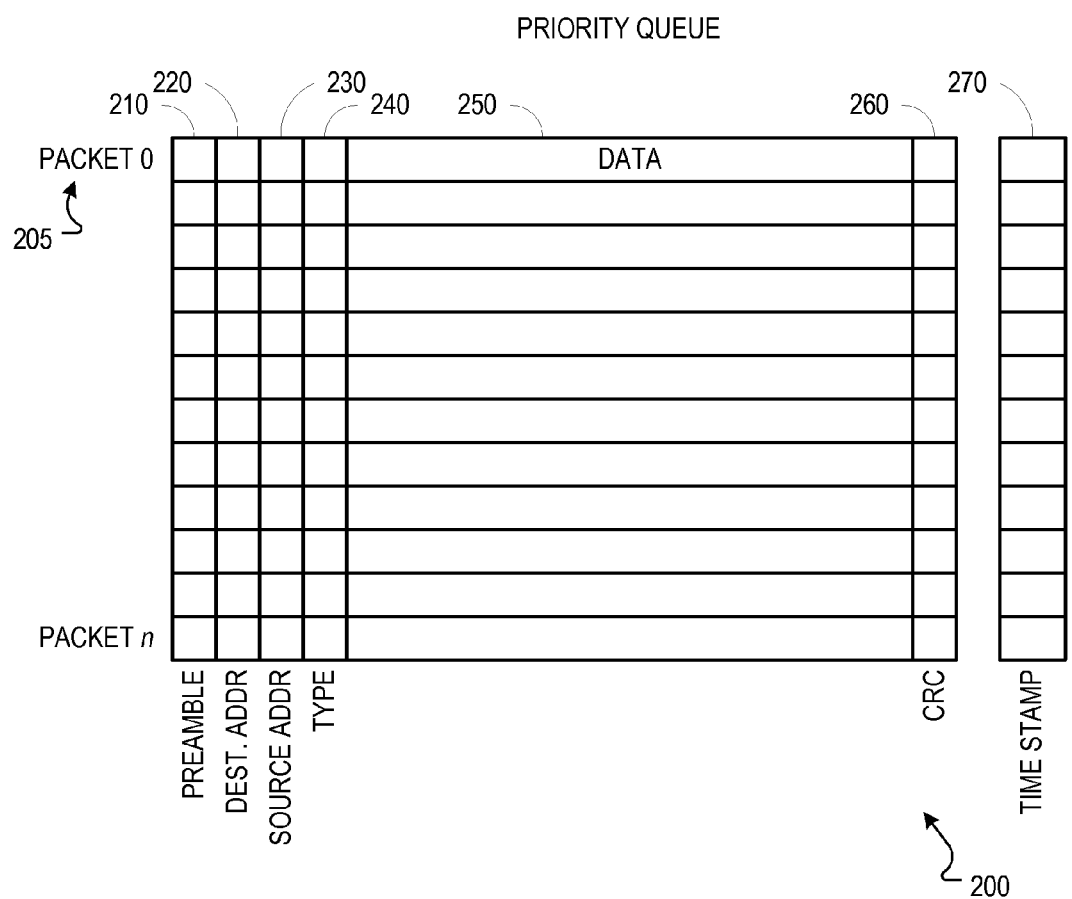
FIG. 2 is a block diagram illustrating an example data structure for priority queuing.

FIG. 2 is a block diagram illustrating an example data structure for priority queuing. A priority queue 200 can include a number of entries 205. The size of the priority queue 200 is typically based upon the load of the network and the priority associated with the queue 200. Each of the entries 205 can include a data packet being transmitted from an originating node to a terminating node (e.g., via any intermediate devices).

In some implementations, the packets 205 can be IP packets. The IP packets, as is known in the art, can contain a number of fields, including, for example, a "preamble" field representation 210, a "destination address" representation 220, a "source address" representation 230, a "type" representation 240, a "data" field representation 250, a "CRC" field representation 260, and a "time stamp" field representation 270. The "preamble" field can represent a frame alignment field used to provide a mechanism by which a receiving device can be sure to correctly identify the fields and other data within the packet. The "destination address" can identify a receiving device, or proxy for the receiving device. The "source address" can identify an originating device, or proxy for the originating device. The "type" of the packet can identify a protocol associated with the data contained in the payload (e.g., "data" field) of the packet. For example, the packet might be an ethernet packet, and can identify the type of higher level packet (e.g., internet protocol) encapsulated in the data field. The "data" field can include data, including any higher level packets encapsulated by the lower level format. The "CRC" field can provide a cyclic redundancy check (CRC) for error checking. In various implementations, the "time stamp" field can include a time stamp identifying when the packets were sent, or a time stamp identifying when the packets were received by the current system. In this example, each of the entries 205 in the queue 200 includes the same fields. The packets can be ordered, for example, in an order in which they were received, and older packets can be transmitted before younger packets (FIFO).

Figure 3:
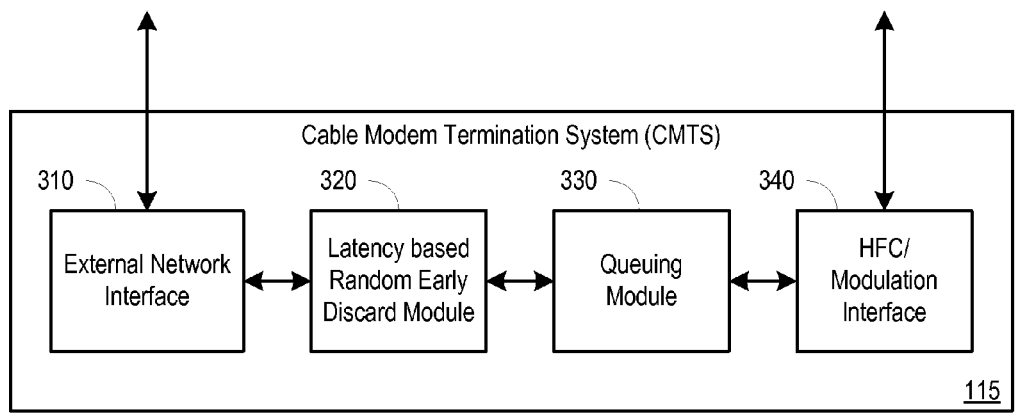
FIG. 3 is a block diagram illustrating a cable modem termination system (CMTS) including latency based random early discard.

FIG. 3 is a block diagram illustrating a CMTS 115 including latency based random early discard. The CMTS 115 can include an external network interface 310, a latency based random early discard module 320, a queuing module 330 and an HFC/modulation interface 340. The external network interface 310 can operate to receive communications from an external network (e.g., the Internet) and to send communications to devices residing on the external network. The external network interface 310 can be set up to use any of a variety of networking communication protocols based upon the protocol(s) used by the external network.

The latency based random early discard module 320 can receive incoming packets via the external network interface 310. The latency based random early discard module 320 can operate to identify a latency metric associated with a queue, and to determine when a latency metric associated with a queue exceeds a threshold latency associated with the queue. Upon detecting that the latency metric associated with the queue exceeds the threshold latency associated with the queue, the latency based random early discard module 320 can determine that the queue is subject to latency based random early discard.

In some implementations, the latency based random early discard module 320 can wait until a new packet is received to determine whether a queue is subject to latency based random early discard. Thus, for example, when a new packet is received, the latency based random early module 320 can identify a type associated with the data packet. The type can be used, for example, to identify the queue with which the packet is associated. After identifying a queue associated with the incoming packet, the latency based random early discard module 320 can identify a latency metric associated with the identified queue.

The latency metric can be identified, in various implementations, based upon an average or median latency of packets stored in a queue, or a subset of packets stored in the queue. In other implementations, the latency metric can be identified as the difference between a time stamp of the oldest packet in the queue and a current time. Other latency metrics can be used to identify the latency of the queue. Such metrics can be calculated based upon retrieval of information from the queuing module 330. For example, the latency based random early discard module 320 can request a time stamp associated with the first five packets (e.g., the five oldest packets) in the queue and calculate an average latency among those packets, in those implementations where a subset of the data packets in the queue is used to identify the latency metric.

In some implementations, the latency based random early discard module 320 can determine whether to discard the incoming packet based upon the latency metric associated with the queue. For example, a latency policy can provide that latency metrics between 50 ms and 150 ms results in a 20% probability that the packet will be dropped by the latency based random early discard module 320. Thus if the latency metric associated with a queue was 100 ms, incoming packets would have a 20% chance of being dropped by the latency based random early discard module 320. In some implementations, the latency policy can provide a spectrum of acceptable latency metrics for a queue. Thus, for example, a queue with a latency metric less than 50 ms can be subject to 0% probability of dropped packets, a queue with a latency metric between 50 ms and 150 ms can be subject to a proportionally increasing probability of dropping packets from 0% to 20%, and a queue with a latency metric greater than 150 ms can drop 100% of packets.

It should also be understood that different latency policies can be provided for different types of priority queues. Thus, the latency policy might define an acceptable latency for a high priority queue as being significantly lower than the acceptable latency in a low priority queue. For example, a latency policy for packets in a videoconferencing traffic queue might be define acceptable latency as less than 10 ms, while the latency policy associated with packets in an instant messaging traffic queue might define acceptable latency as less than 0.5 seconds.

Upon identifying the latency policy associated with the queue, the latency based random early discard module 320 can determine whether to discard a packet. In some implementations, the discard decision can be made with respect to the incoming data packet. In other implementations, the discard decision can be made with respect to one or more packets already in the queue (e.g., the oldest packet in the queue) which would be discarded to accommodate the new incoming packet. It should be understood that the latency based random early discard module 320 can randomly generate a number to determine whether the selected packet(s) will be discarded. For example, the latency based early discard module 320 can generate a random number between 0 and 1. If the probability of discard is 20%, any randomly generated number between the range of 0.0 and 0.2 can cause the selected packet to be discarded. Other methods to determine whether to drop one or more packets can be used.

If it is determined that the incoming packet is to be dropped, the packet is not forwarded to the queuing module 330. If it is determined that any of the packets in the queue are to be dropped (e.g., the oldest packet in the queue), then the latency based random early discard module 320 can send instructions to the queuing module identifying one or more packets in the queue to be dropped. In some implementations, the packet to be dropped can be identified by a time stamp associated with the packet. However, if it is determined that the queue is not subject to latency based random early discard or the packet is not selected to be dropped, the latency based random early discard module 320 can forward the incoming packet to the queuing module 330.

The queuing module 330 is operable to maintain multiple queues. In some implementations, the queuing module 330 can include a queue for each of the types of traffic supported by the network. In other implementations, the types of traffic with similar priority requirements can be grouped together, such that any particular priority queue might contain multiple packet types with similar delivery requirements. The queuing module 330 can communicate with the latency based random early discard module 320 to identify latency in any of the various queues maintained by the queuing module 330. Additionally, the queuing module 330 can communicate with the HFC/modulation interface 340 to provide packets for transmission to subscribers.

The HFC/modulation interface 340 can communicate with the queuing module 330 to identify packets to be transmitted to subscribers (e.g., set top boxes, cable modems, MTAs, etc.). In some implementations, packets from a higher priority queue are transmitted before packets from any lower priority queues. Thus, for example, if a medium priority queue and a higher priority queue both have packets, those higher priority queue packets are transmitted until there are no packets to transmit in any higher priority queues, and then packets in the medium priority queue can be transmitted.

In some implementations, the HFC/modulation interface 340 can transmit communications directly to an HFC network (e.g., HFC network 155 of FIG. 1). In other implementations, the HFC/modulation interface 340 can transmit communications to a modulator (e.g., an EQAM, combiner, mixer, etc.) for generation of an RF signal for transmission on an HFC network.

It should be understood that the network device can be bi-directional. Thus, for example, the queuing system can queue both inbound and outbound network traffic. In some implementations, the latency based random early discard module 330 can operate to evaluate both incoming and outgoing queues.

Figure 4:
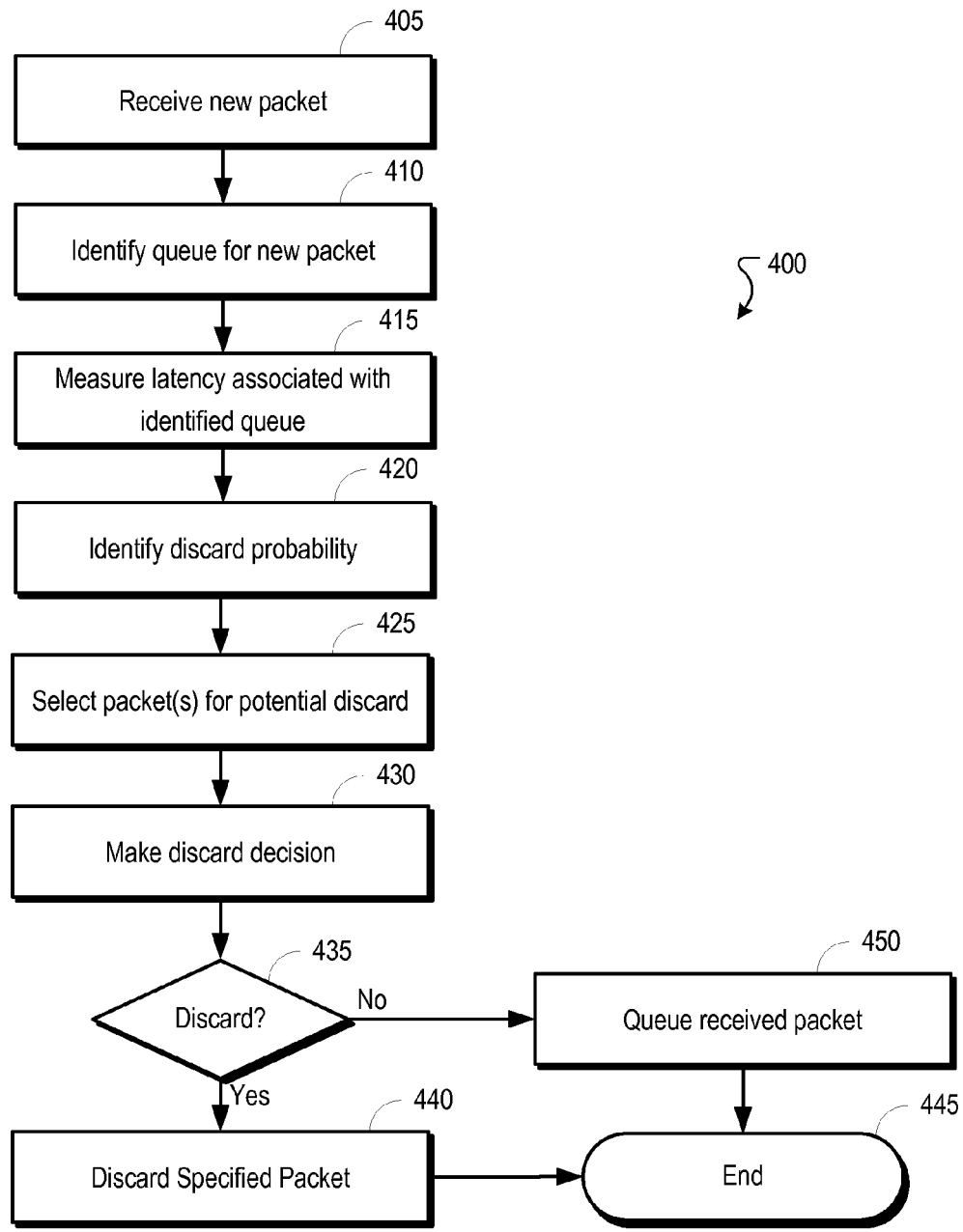
FIG. 4 is a flowchart illustrating an example process for latency based random early discard.

FIG. 4 is a flowchart illustrating an example process 400 for latency based random early discard. The process 400 can begin at stage 405 when a new packet is received. The new packet can be received at a network device, for example, by an external network interface (e.g., external network interface 310 of FIG. 3) or from an HFC through an HFC interface. The external network interface or HFC interface can support the protocol for external network or HFC, respectively, and can forward the received packets to a queue management module (e.g., a latency based random early discard module).

At stage 410, a queue for the new packet is identified. The queue for the new packet can be identified, for example, by a queue management module (e.g., the latency based random early discard module 320 of FIG. 3). In some implementations, a type associated with the new packet can be identified based upon a low level type field associated with the packet. In other implementations, the type associated with the packet can be identified based upon data contained in the higher level information included in the payload of the received packet.

At stage 415, the latency associated with the queue is measured. The latency can be measured, for example, by a queue management module (e.g., a latency based random early discard module). The latency can provide a metric by which the amount of time a packet has been in a queue before delivery. In some implementations, the queue latency can be measured based upon an average amount of time the packets in the queue, or a subset of packets in the queue, have been in the queue. In other implementations, queue latency can be measured based upon the oldest (e.g., first) packet in the queue.

At stage 420, a discard probability can be identified. The discard probability can be identified, for example, by a queue management module (e.g., a latency based random early discard module) in conjunction with a latency policy. In some implementations, the latency can describe a spectrum of discard probabilities based upon the type of packet and the latency metric associated with the packet. The discard probability can be specified, for example, as a percentage chance that the packet will be discarded.

At stage 425, one or more packets are selected for a discard decision. The one or more packets can be selected, for example, by a queue management module (e.g., latency based random early discard module). In some implementations, the queue management module can select the incoming packet for a discard decision. In other implementations, the queue management module can select the oldest packet in the queue for a discard decision when a new packet arrives. Other mechanisms can be used to select the one or more packets for potential discard.

At stage 430, the discard decision is made. The discard decision can be made, for example, by a queue management module (e.g., latency based random early discard module). In some implementations, a random number can be generated and used to determine whether the packet will be discarded.

At stage 435 it is determined whether the decision was to discard or queue. The decision can be made, for example, by the queue management module (e.g., a latency based random early discard module). If the decision was to discard the packet, the packet is discarded at stage 440. The packet can be discarded, for example, by a queue management module (e.g., latency based random early discard module). However, if the decision is made to queue the packet, the packet is queued at stage 445. The packet can be queued for example, by a queue management module (e.g., latency based random early discard module) in conjunction with a queuing module (e.g., queuing module 330 of FIG. 3). The process 400 ends at stage 450.

Figure 5:
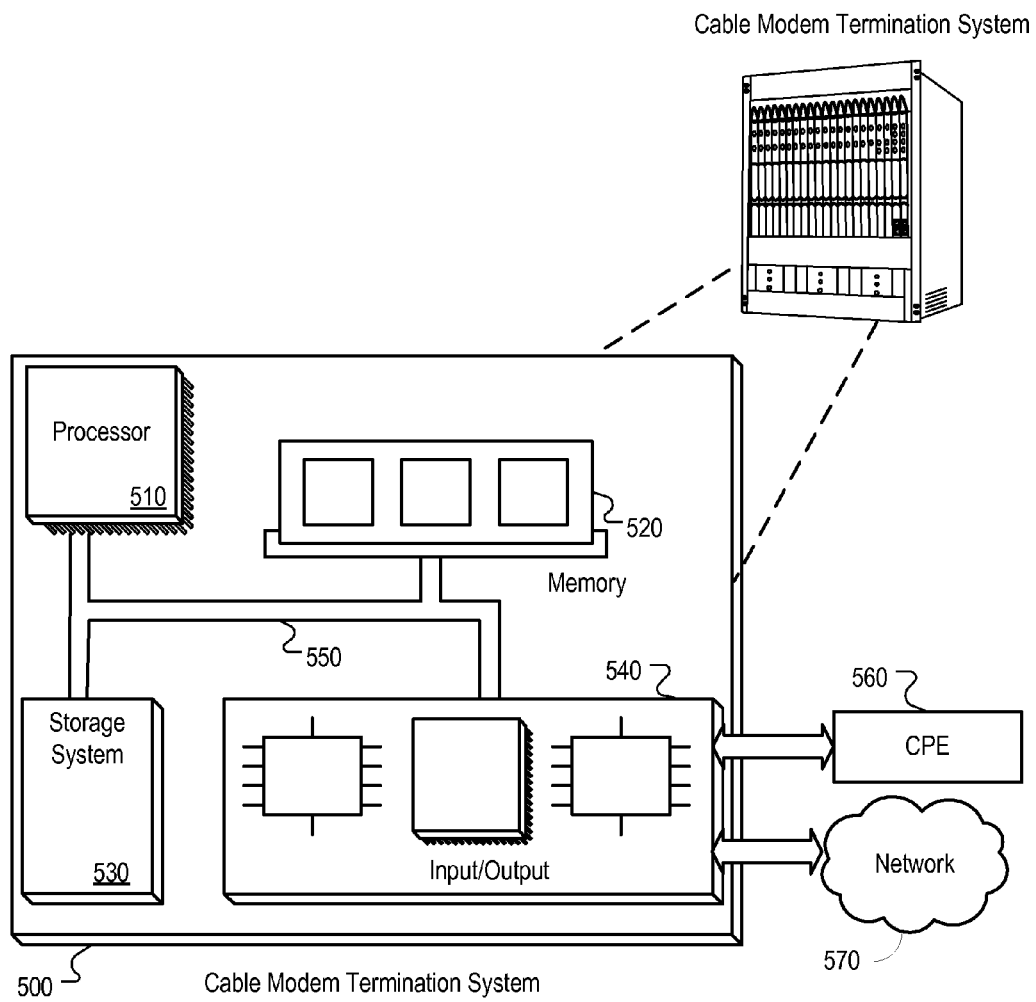
FIG. 5 is a block diagram of an example CMTS device that can include latency based random early discard.

FIG. 5 is a block diagram of an example CMTS device that can include latency based random early discard. However, it should be understood that many different kinds of network devices (e.g., including network hubs, bridges, routers, edge termination devices, etc.) can implement a latency based random early discard mechanism. The CMTS 500 can include a processor 510, a memory 520, a storage device 530, and an input/output device 540. Each of the components 510, 520, 530, and 540 can, for example, be interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

In some implementations, the storage device 530 is capable of providing mass storage for the system 500. In one implementation, the storage device 530 is a computer-readable medium. In various different implementations, the storage device 530 can, for example, include a hard disk device, an optical disk device, flash memory or some other large capacity storage device.

The input/output device 540 provides input/output operations for the system 500. In one implementation, the input/output device 540 can include one or more of a plain old telephone interface (e.g., an RJ11 connector), a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, such as one or more CPE devices 560 (e.g., set top box, cable modem, etc.), as well as sending communications to, and receiving communications from a network 570. Other implementations, however, can also be used, such as mobile computing devices, mobile communication devices, set-top box television client devices, etc.

The network device (e.g., CMTS, EQAM, network router, etc.) of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method, comprising:
   identifying a latency metric associated with each of a plurality of queues, the plurality of queues being operable to store data packets for delivery to recipient devices, and the latency metric identifying the actual latency associated with a queue;
   determining whether the latency metric associated with any of the plurality of queues exceeds a threshold latency value associated with the respective queue, wherein each queue is associated with a different threshold latency value based on the traffic flow associated with the respective queue;
   determining whether to discard one or more packets from those queues where the latency metric associated with the queue exceeds the threshold value; and
   wherein the determination of whether to discard one or more of the packets is a weighted probability of discard based upon the latency metric associated with the respective queue
   receiving an incoming data packet;
   identifying a queue with which the incoming data packet is associated from among the plurality of queues;
   placing the data packet into the identified queue;
   determining whether the latency metric associated with the identified queue for the incoming data packet is greater than the threshold latency value associated with the queue; and
   determining whether to discard the incoming data packet responsive to a determination that the latency metric exceeds the threshold value associated with the queue.

2. The computer-implemented method of claim 1, wherein the plurality of queues correspond to quality of service constraints.

3. The computer-implemented method of claim 1, wherein the plurality of queues correspond to various types of traffic being delivered.

4. The computer-implemented method of claim 1, wherein a first threshold latency value for a first queue from the plurality of queues is different than a second threshold latency value for a second queue from the plurality of queues.

5. The computer-implemented method of claim 1, wherein identifying the latency metric comprises determining a length of time an oldest packet in a respective queue has been resident in the respective queue.

6. The computer-implemented method of claim 1, wherein identifying the latency metric comprises identifying an oldest data packet in a respective queue.

7. The computer-implemented method of claim 6, wherein determining whether to discard one or more packets comprises determining whether to discard the oldest data packet in a respective queue where the latency metric associated with the respective queue exceeds the threshold latency value.

8. The computer-implemented method of claim 1, wherein identifying the latency metric comprises calculating an average latency of at least a portion of data packets in a respective queue.

9. The computer-implemented method of claim 1, wherein identifying the latency metric comprises calculating an aggregate latency of at least a portion of data packets in a respective queue.

10. The computer-implemented method of claim 1, wherein the latency metric is derived from a delivery schedule associated with the packets in a respective queue.

11. The computer-implemented method of claim 1, wherein the threshold latency value comprises a dynamic threshold latency value that varies based upon a usage level of space in a respective queue.

12. The computer-implemented method of claim 1, wherein the threshold latency value associated with each of the plurality of queues is variable according to a portion of a buffer that is occupied by packets associated with the respective queue.

13. One or more computer-readable media having instructions stored thereon, the one or more computer readable media, when executed by a processor, cause the processor to perform operations comprising:
    receiving an incoming data packet;
    identifying a queue with which the incoming data packet is associated from among a plurality of queues;
    placing the data packet into the identified queue;
    identifying a latency metric associated with the identified queues, wherein each identified queue is associated with a different threshold latency value based on the traffic flow associated with a respective queue, and the latency metric identifies the actual latency associated with data packets in the respective queue;
    determining whether the latency metric associated with the identified queue exceeds a threshold latency value associated with the identified queue;
    determining whether to discard one or more packets from the identified queue where the latency metric associated with the identified queue exceeds the threshold latency value; and
    wherein the determination of whether to discard one or more of the packets is a weighted probability of discard based upon a usage level associated with the identified queue.

14. The one or more computer-readable media of claim 13, wherein identifying the latency metric comprises determining a length of time an oldest packet in the identified queue has been resident in the identified queue.

15. The one or more computer-readable media of claim 13, wherein identifying the latency metric comprises identifying an oldest data packet in the identified queue.

16. The one or more computer-readable media of claim 15, wherein determining whether to discard one or more packets comprises determining whether to discard the oldest data packet in the identified queue where the oldest data packet in the identified queue is older than the threshold latency value.

17. The one or more computer-readable media of claim 13, wherein identifying the latency metric comprises calculating an average latency of at least a portion of data packets in the identified queue.

18. The one or more computer-readable media of claim 13, wherein identifying the latency metric comprises calculating an aggregate latency of at least a portion of data packets in the identified queue.

19. The one or more computer-readable media of claim 13, wherein the latency metric is derived from a delivery schedule associated with the packets in the identified queue.

20. The one or more computer-readable media of claim 13, wherein the threshold latency value comprises a dynamic threshold latency value that varies based upon a usage level of space in the identified queue.

21. The one or more computer-readable media of claim 13, wherein determining whether to discard one or more packets from the identified queue where the latency metric associated with the identified queue exceeds the threshold latency value comprises determining whether to discard the incoming data packet.

\* \* \* \* \*